United States Patent [19]

Faulkner

[11] Patent Number: 4,972,942

[45] Date of Patent: Nov. 27, 1990

[54] CONVEYOR BELT

[76] Inventor: William G. Faulkner, 6701 Newman Dr., Oklahoma City, Okla. 73162

[21] Appl. No.: 220,601

[22] Filed: Jul. 18, 1988

[51] Int. Cl.⁵ .............................................. B65G 17/06
[52] U.S. Cl. .................................................. 198/853
[58] Field of Search .......................... 198/831, 851–853

[56] References Cited

U.S. PATENT DOCUMENTS

| | | | |
|---|---|---|---|
| 912,600 | 2/1909 | McPherson | 198/853 |
| 1,027,352 | 5/1912 | Morse . | |
| 1,558,719 | 10/1925 | Sturtevant . | |
| 1,561,676 | 11/1925 | Wertman . | |
| 1,562,843 | 11/1925 | Muller . | |
| 1,563,065 | 11/1925 | Belcher . | |
| 1,564,798 | 12/1925 | Sturtevant . | |
| 1,569,234 | 1/1926 | Muller . | |
| 1,638,388 | 8/1927 | Belcher . | |
| 1,649,845 | 11/1927 | Muller . | |
| 1,678,450 | 7/1928 | Sturtevant . | |
| 2,413,843 | 1/1947 | Perry . | |
| 2,602,344 | 7/1952 | Bremer . | |
| 2,653,485 | 9/1953 | MacArthur . | |
| 2,667,791 | 2/1954 | Bremer . | |
| 3,159,267 | 12/1964 | Jeffrey | 198/853 |
| 3,261,451 | 7/1966 | Roinestad | 198/852 |
| 3,348,680 | 10/1967 | Mathews et al. | 198/851 |
| 4,140,025 | 2/1979 | Lapeyre . | |
| 4,222,483 | 9/1980 | Wooton et al. | 198/831 |
| 4,449,960 | 5/1984 | van der Lely . | |
| 4,507,106 | 3/1985 | Cole . | |
| 4,556,142 | 12/1985 | Lapeyre | 198/853 |
| 4,581,001 | 4/1986 | Rattunde et al. . | |

FOREIGN PATENT DOCUMENTS

34766  12/1964  German Democratic
                Rep. .................................. 198/853

Primary Examiner—Joseph E. Valenza

[57] ABSTRACT

A conveyor belt comprising a plurality of link assemblies connected together by a plurality of link shafts. The conveyor belt includes a plurality of first guards with each first guard connected to one end of one link assemblies and encompassing one end of one of the link shafts for protecting the end of the link shaft and substantially preventing the end of the link shaft from engaging objects during the operation of the conveyor belt. A plurality of second guards are connected to the opposite end of the link assemblies for encompassing the opposite ends of the link shaft for protecting such opposite ends and substantially preventing such opposite ends from engaging objects during the operation of the conveyor belt. The link shafts extend through openings provided in the link assemblies and each opening is formed on a radius larger than the radius of the links shaft for providing shaft rocking surfaces so that the link shafts roll on the shaft rocking surfaces for substantially reducing rotating friction between the link shafts and adjacent portions of the link assemblies. Each link assembly comprises at least two modules which are positioned in an end-to-end relationship in the assembled position of the link assemblies. The modules in one set of link assemblies are formed of a plurality of whole links, and the modules in one other set of link assemblies are formed of a plurality of whole links with last link in each module to be placed near the last link in each module to be placed near the last link in an adjacent module in the assembled position of the link assembly comprising a half link. The sets of link assemblies are alternatively disposed in the conveyor belt so that every alternate row of connected links comprises only whole links with no spacing or joints between modules.

34 Claims, 5 Drawing Sheets

CONVEYOR BELT

FIELD OF THE INVENTION

The present invention relates generally to conveyor belts and, more particularly, but not by way of limitation, to a conveyor belt having guards for protecting the ends of link shafts and wherein each link shaft extends through openings in the link assemblies, the opening being formed in such a manner as to substantially reduce rotating friction between the link shaft and adjacent portions of the links, and wherein the link assemblies are formed from modules shaped so that each alternate row of links comprises only whole links with no spacing between modules.

2

DESCRIPTION OF THE PREFERRED EMBODIMENTS

Figure 1:
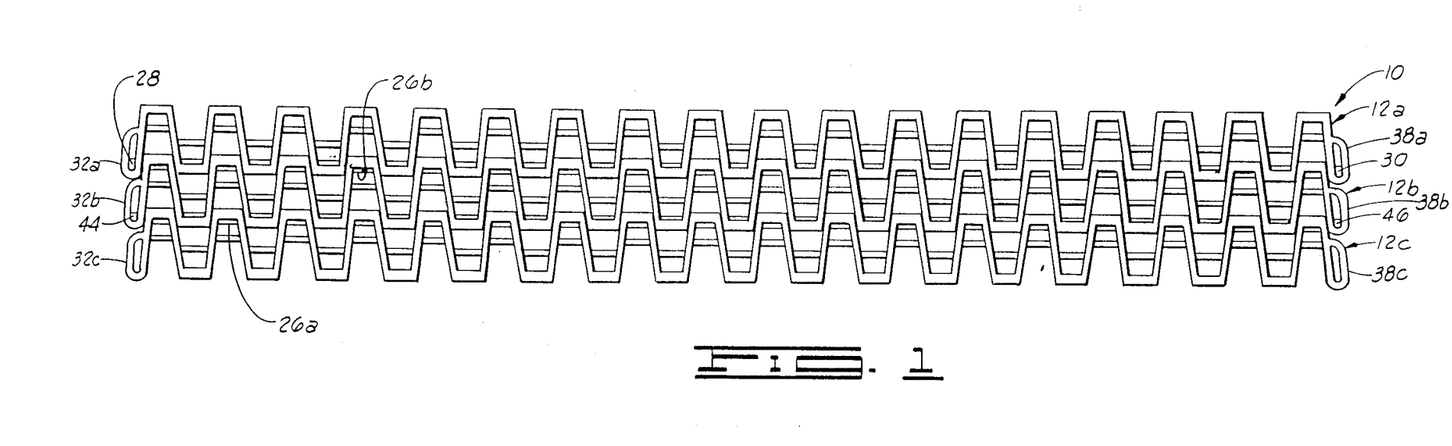
FIG. 1 is a bottom plan view of a portion of a conveyor belt constructed in accordance with the present invention, the portion of the conveyor belt shown in FIG. 1 including only three link assemblies.

Shown in FIG. 1 and designated therein by the general reference numeral 10 is a conveyor belt which is constructed in accordance with the present invention. Only a portion of the conveyor belt 10 is shown in FIG. 1 and, as shown in FIG. 1, the conveyor belt 10 comprises a plurality of link assemblies 12, only three link assemblies 12 being shown in FIG. 1 and designated therein by the individual reference numerals 12a, 12b and 12c. It is to be understood that a conveyor belt constructed in accordance with the present invention in practice will comprise a large number of link assemblies 12 interconnected to form an endless conveyor belt 10 which generally is extended about sprockets and used for conveying objects in a manner well known in the art.

Figure 2:
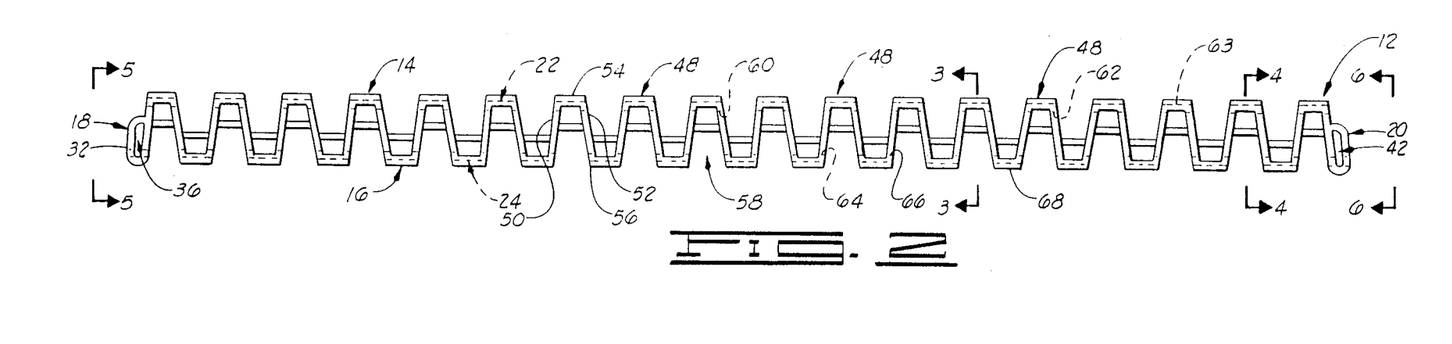
FIG. 2 is a bottom plan view of a typical link assembly.

Each link assembly 12 has a forward end 14, a rearward end 16, a first side 18 and a second side 20, as shown more clearly in FIG. 2 with respect to a typical link assembly 12. Each link assembly 12 also includes a first shaft opening 22 (FIG. 2) which extends through the forward end 14 of each link assembly 12 and which extends generally between the first and second sides 18 and 20 of each link assembly 12. Each link assembly 12 also includes a second shaft opening 24 (FIG. 2) which extends through the rearward end 16 of each link assembly 12 and which extends generally between the first and second sides 18 and 20 of each link assembly 12.

The conveyor belt 10 also includes a plurality of link shafts 26, two link shafts 26 being shown in FIG. 1 and designated therein by the individual reference numerals 26a and 26b. Each link shaft 26 extends through the first shaft opening 22 in one of the link assemblies 12 and through the second shaft opening 24 in another link assembly 12 for connecting the two link assemblies 12. Each link shaft 26 includes a first end 28 and a second end 30, as shown in FIG. 1 with respect to the link shaft 26b. The first end 28 of each link shaft 26 extends a distance beyond the first side 18 of one of the link assemblies 12 and the second end 30 of each link shaft 26 extends a distance beyond the second side 20 of one of the link assemblies 12.

The conveyor belt 10 includes a plurality of first guards 32, three first guards 32 being shown in FIG. 1 and designated therein by the individual reference numerals 32a, 32b and 32c. Each first guard 32 is connected to the first side 18 of one of the link assemblies 12. Each first guard 32 extends generally over the first end 28 of one of the link shafts 26 and generally encompasses the first end 28 of one of the link shafts 26. The first guards 32 cooperate to encompass and substantially protect the first ends 28 of the link shafts 26 and substantially prevent the first ends 28 of the link shafts 26 from engaging objects during the operation of the conveyor belt 10 which can result in damage or destruction to the first ends 28 of the link shafts 26.

Figure 5:
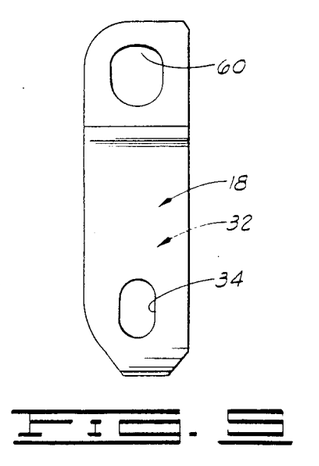
FIG. 5 is an end elevational view of a typical link assembly taken substantially along the lines 5—5 of FIG. 2.

As shown in FIG. 5, an access opening 34 is formed through each of the first guards 32 and each access opening 34 is generally aligned with one of the second shaft openings 24 in one of the links assemblies 12. Each first guard 32 is connected to the rearward end 16 of one of the link assemblies 12 and each first guard 32 extends a distance generally from the rearward end 16 toward the forward end 14 of one of the link assemblies 12. The opposite end of each first guard 12 is connected to the first side 18 of one of the link assemblies 12 generally between the forward end 14 and the rearward end 16 thereby forming a shaft space 36 (FIG. 2) between each first guard 32 and the first side 18 of one of the link assemblies 12.

The first end 28 of each of the link shafts 26 extends through the second shaft opening 24 in one of the link assemblies 12 and into the shaft space 36 formed by one of the first guards 32. The access openings 34 and the shaft spaces 36 provided by the first guards 32 provide openings for visual inspection of the first end 28 portions of the link shafts 26 and the adjacent portions of the second shaft openings 24 and the link assemblies 12.

The conveyor belt 10 includes a plurality of second guards 38, three second guards 38 being shown in FIG. 1 and being designated therein by the individual reference numerals 38a, 38b and 38c. Each second guard 38 is connected to the second side 20 of one of the link assemblies 12. Each second guard 38 extends generally over the second end 30 of one of the link shafts 26 and generally encompasses the second end 30 of one of the link shafts 26. The second guards 38 cooperate to encompass and substantially protect the second ends 30 of the links shafts 26 and substantially prevents the second ends 30 of the link shafts 26 from engaging objects during the operation of the conveyor belt 10 which can result in damage or destruction to the second ends 30 of the link shafts 26.

Figure 6:
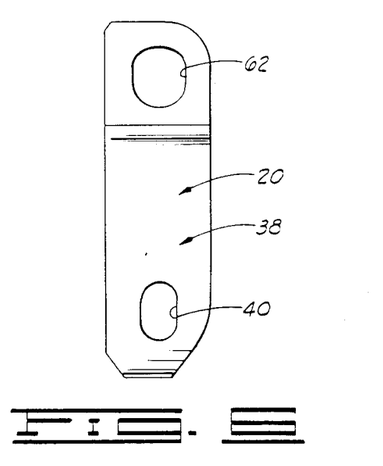
FIG. 6 is an end elevational view of a typical link assembly, taken substantially along the lines 6—6 of FIG. 2.

As shown in FIG. 6, an access opening 40 is formed through each of the second guards 38 and each access opening 40 is generally with aligned with one of the second shaft openings 24 in one of the links assemblies 12. Each second guard 38 is connected to the rearward end 16 of one of the link assemblies 12 and each second guard 38 extends a distance generally from the rearward end 16 toward the forward end 14 of one of the link assemblies 12. The opposite end of each second guard 38 is connected to the second side 20 of one of the link assemblies 12 generally between the forward end 14 and the rearward end 16 thereby forming a shaft space 42 (FIG. 2) between each second guard 38 and the second side 20 of one of the link assemblies 12.

The second end 30 of each of the link shafts 26 extends through one of the second shaft openings 24 in one of the link assemblies 12 and into one of the shaft spaces 42 formed by one of the second guards 38. The access openings 40 and the shaft spaces 42 provided by the second guards 38 provide openings for visual inspection of the second end 30 portions of the link shafts 26 and the adjacent portions of the second shaft openings 24 and the link assemblies 12.

To connect the link assemblies 12 with the link shafts 26, the forward end 14 of each of the link assemblies 12 is disposed near the rearward end 16 of another link assembly 12 and positioned so that the first shaft opening 22 in one of the link assemblies 12 is generally aligned with the second shaft opening 24 in the adjacent link assembly 12. In this position, one of the link shafts 26 is extended through the first and the second shaft openings 22 and 24 of the adjacent link assemblies 12 to a position wherein the first end 28 of each link shaft 26 extends into the shaft space 36 provided by one of the first guards 32 and the second end 30 of each link shaft 26 extends a distance into the shaft space 42 provided by one of the second guards 38.

In this position of the link shaft 26, a device such as a soldering iron can be inserted through the access opening 34 in each of the first guards 32 and into engagement with the first ends 28 of the link shafts 26 for deforming the first ends 28 of the link shafts 26 and forming a shaft head 44 (one shaft head 44 being designated by a reference numeral in FIG. 1) on each first end 28. Each shaft head 44 has a diameter larger than the diameter of the first and the second shaft openings 22 and 24 thereby preventing each of the links shaft 26 from being removed through the first and the second shaft openings 22 and 24 due to the engagement between the shaft head 44 and the first side 18 of each of the link assemblies 12.

In a like manner, a device such as a soldering iron can be inserted through the access opening 40 in each of the second guards 38 and into an engagement with the second ends 30 of the link shafts 26 for deforming the second end 30 of one of the link shafts 26 and for forming a shaft head 46 (one shaft head 46 being designated by a reference numeral in FIG. 1) on each second end 30. Each shaft head 46 has a diameter larger than the diameter of the first and the second shaft openings 22 and 24 thereby preventing each of the link shaft 26 from being removed through the first and the second openings 22 and 24 due to the engagement between the shaft head 46 and the second side 20 of each of the link assemblies 12.

Each link assembly 12 includes a plurality of links 48 (three links 48 being designated by reference numerals in FIG. 2). Each link 48 includes a first side 50, second side 52 a forward end 54 and rearward end 56 (shown in FIG. 2 with respect to one of the links 48). A link opening 58 (shown in FIG. 2 with respect to one of the links 48) is formed through the rearward end 56 of each link 44. Each link opening 58 extends generally between the first and the second sides 50 and 52 of each link 48. Each link opening 58 is shaped to receive a portion of the forward end 54 of one of the links 48 in an adjacent link assembly 12.

In an assembled position of the link assemblies 12, the forward end 14 of each link assembly 12 is placed adjacent the rearward end of another link assembly 12 with the forward end 54 of each of the links 48 in one of the link assemblies 12 being inserted and disposed generally within one of the link openings 58 in one of the links 48 of the adjacent link assembly 12. The adjacent link assemblies 12 extends in a generally parallel relationship with the first sides 18 of each of the link assemblies 12 being generally aligned and the second sides 20 of each of the link assemblies 12 being generally aligned.

A first forward link shaft opening 60 (shown in FIG. 2 with respect to one of the links 48 and shown in FIG. 3) is formed through the first side 50 of each of the links 48 generally near the forward end 54. A second forward link shaft opening 62 (shown in FIG. 2 with respect to one of the links 48 and shown in FIG. 4) is formed through the second side 52 of each of the links 48, generally near the forward end 54. The first and the second forward link shaft openings 60 and 62 are aligned, and each forward link shaft openings 60 and 62 is sized and adapted to receive one of the link shafts 26. The link shaft openings 60 and 62 form the first shaft opening 22.

Figure 3:
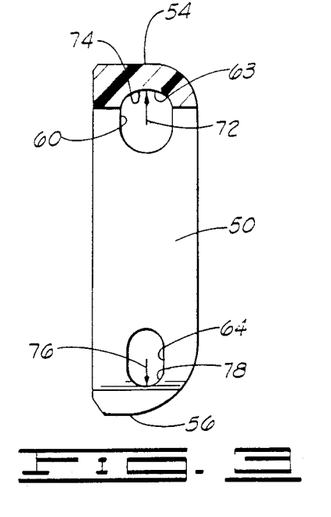
FIG. 3 is sectional view of a link in one of the link assemblies, taken substantially along the lines 3—3 of FIG. 2, but not showing the link shaft.
Figure 4:
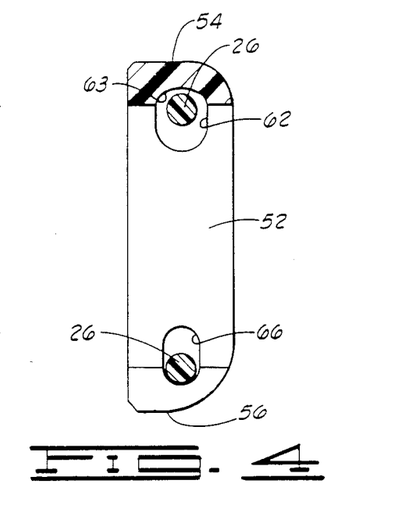
FIG. 4 is a sectional view of a link in one of the link assemblies, taken substantially along the lines 4—4 of FIG. 2, and showing the link shafts in section.

A recess 63 is formed through a portion of the forward end 54 of each link 48, as shown in FIG. 1 with respect to one of the links 48 and as shown in FIGS. 3 and 4. Each recess 63 is generally aligned with the first and second forward link shaft openings 60 and 62. Each recess 63 is shaped and adapted to receive a portion of one of the link shafts 26. The link shafts 26 extend through the first and second forward link shaft openings 60 and 62 and through the recess 63.

A first rearward link shaft opening 64 (shown in FIG. 1 with respect to one of the links 48 and shown in FIG. 3) is formed through the first side 50 of each of the links 48, generally near the rearward end 56. A second rearward link shaft opening 66 (shown in FIG. 1 with respect to one of the links 48 and shown in FIG. 4) is formed through the second side 52 of each of the links 48 generally near the rearward end 56. The first and the second rearward links shaft opening 64 and 66 are aligned and each of the rearward link shaft openings 64 and 66 is sized and adapted to receive one of the link shafts 26. The link shaft openings 64 and 66 cooperate to form the second shaft opening 24.

One end of a connecting member 68 (one connecting member 68 being designated by a reference numeral in FIG. 2) is secured to the second side 52 of each of the links 48 generally near the rearward end 56. Each connecting member 68 extends a distance generally from the second side 52 of each of the links 48 and the opposite end of each of the connecting member 68 is connected to the first side 50 of an adjacent link 48 generally near the rearward end 56. The connecting members 68 cooperate to connect the links 48 to form a row of links 48 in each link assembly 12.

The forward ends 54 of each of the links 48 in each link assembly 12 cooperate to form the forward end 14 of each link assembly 12. The rearward ends 56 of each of the links 48 in each link assembly 12 cooperate to form the rearward end 16 of each link assembly 12. The first side 50 of one of the links 48 in each link assembly 12 cooperates to form the first side 18 of each link assembly 12. The second side 52 of one of the links 48 and each link assembly 12 cooperate to form the second side 20 of each link assembly 12.

In an assembled position of the link assemblies 12 to form the conveyor belt 10, the forward end 14 of each of the link assemblies 12 is placed generally adjacent the rearward end 16 of one of the other link assemblies 12. The forward ends 54 of each of the links 48 in one of the link assemblies 12 is disposed generally within the link opening 58 in one of the links 48 in the adjacent link assembly 12 and positioned so that the first forward link shaft openings 60 and 62 in each of the links 48 in one of the link assemblies 12 is aligned with the rearward link shaft openings 64 and 66 in the adjacent link assembly 12. In this position, a link shaft 26 is inserted through the aligned forward link shaft openings 60 and 62 and the aligned rearward link shaft openings 64 and 66 to connect the two adjacent link assemblies 12.

Each of the links 48 also includes a link brace 70 (one link brace 70 being designated by a reference numeral in FIG. 2). Each link brace 70 has one end connected to the first side 50 and an opposite end connected to the second side 52 of one of the links 48. Each link brace 70 extends generally between the first and the second sides 50 and 52 of one of the links 48 and cooperates to provide additional structural strength for maintaining the first side 50 separated from the second side 52.

As shown in FIGS. 3 and 4, each of the forward link shaft openings 60 and 62 more particularly comprises an elongated opening having an upper end portion formed on a radius 72 (shown in FIG. 3 with respect to the opening 60) and comprising what sometimes is referred to herein as a shaft rocking surface 74 (shown in FIG. 3 with respect to the opening 60) within each forward link shaft opening 60 and 62.

Each of the rearward link shaft openings 64 and 66 more particularly comprises an elongated opening having a lower end portion formed on a radius 76 (shown in FIG. 3 with respect to the opening 64) and comprising what sometimes is referred to herein as a shaft engaging surface 78 (shown in FIG. 3 with respect to the opening 64) within each rearward link shaft opening 64 and 66.

The radius 72 is larger than the diameter of the link shafts 26. The radius 72 preferably is sized so that the shaft rocking surface 74 approximates a flat surface while still maintaining an arc shape or shallow V-shape. The shaft rocking surface 74 extends over a distance (arc length) sufficiently large or long so that the link shaft 26 remains on the shaft rocking surface 74 as the conveyor belt 10 is moved over a curved path such as about a sprocket.

In the assembled position of the link assemblies 12, the link shafts 26 extend through the link shaft openings 60, 62, 64 and 66. The link shaft openings 60 and 62 are sized and shaped so that each link shaft 26 rides normally at about a central position on each of the shaft rocking surfaces 74, as indicated in FIG. 4. As the conveyor belt 10 moves over a curved path such as over a sprocket, the link shafts 26 rock or roll on the shaft rocking surfaces 74 and the link shafts 26 remain in a substantially stationary position with respect to the shaft engaging surfaces 78. In other words, there virtually is no relative movement between the link shafts 26 and the shaft engaging surfaces 78 as the conveyor belt 10 moves over a curved path.

The rocking motion of the link shafts 26 on the shaft rocking surface 74 substantially reduces rotating friction between the link shafts 26 and the portions of the links 48 generally formed by the shaft rocking surfaces 74 and 78.

Figure 7:
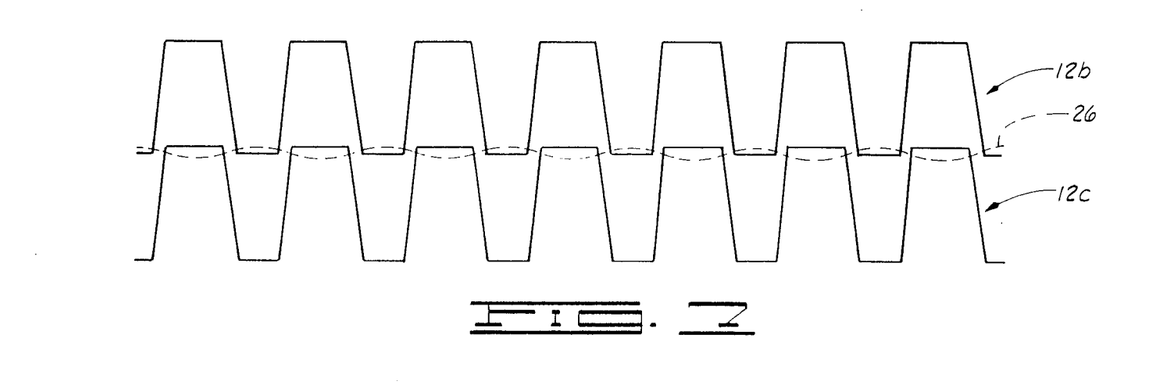
FIG. 7 is a schematic view of two link assemblies connected together via a link shaft (shown in dashed lines) and illustrating in exaggerated form one operational position of the link shaft where the portion of the conveyor belt illustrated is under tension tending to pull the one link assembly apart from the other link assembly.

The fact that the link shafts 48 tend to rock on the shaft rocking surfaces 74 is particularly significant when the conveyor belt 10 is constructed from plastic or ceramic link assemblies 12 and plastic or ceramic link shafts 26. When the conveyor belt 10 is in operation and under tension tending to separate one link assembly 12 from the adjacent link assembly 12, each link shaft 26 is bent slightly at the points where the link shaft 26 enters or exits the shaft openings 60 and 64 and 62 and 66 thereby causing the link shafts 26 to be bent in a somewhat sine wave shape over the length of the link shaft 26, as shown in FIG. 7 with respect to the one link shaft 26 shown schematically in dashed lines and the two link assemblies 12b and 12c schematically shown in FIG. 7. In this instance, the link shaft 26 virtually is prevented from rotating as the conveyor belt 10 moves about a sprocket (not shown). If the shaft openings 60 and 62 were simply circularly shaped with a diameter slightly larger than the diameter of the link shaft 26, there would be greatly increased rotational friction between the link shaft 26 and adjacent portions of the links 48 resulting in substantial wear of the link shafts 26. In the present invention, this wear substantially is reduced since the link shafts 26 roll or rock on the shaft rocking surfaces 74.

Figure 9:
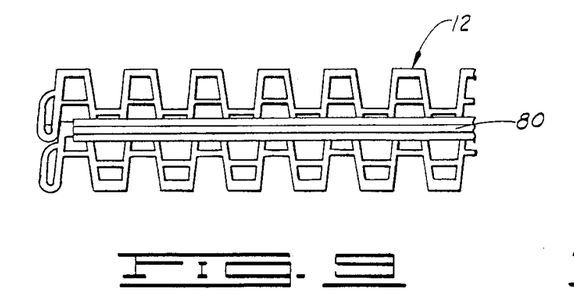
FIG. 9 is a top plan view of a modified conveyor belt constructed like the conveyor belt of FIG. 1, but including flights (only one flight being shown in FIG. 9).
Figure 10:
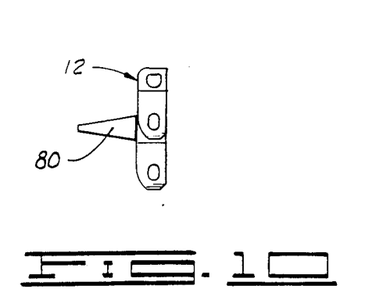
FIG. 10 is a side elevational view of the portion of the conveyor belt shown in FIG. 9.

As shown in FIGS. 9 and 10, the conveyor belt 10 also may include a plurality of flights 80 for cooperating in moving material, only one flight 80 being shown in FIG. 7. Each flight 80 includes a portion which extends into the link assemblies 12 and includes openings (not shown) for receiving the link shafts 26. Thus, each of the link shaft 26 also extends through openings (not shown) in the flights 80 for connecting the flights 80 to the conveyor belt 10.

Conveyor belts such as the conveyor belt 10 commonly have to be made with different widths extending between the first and the second sides 18 and 20 of the link assemblies 12. If each link assembly 12 is a single molded unitary product, this would mean that a different mold would have to be made for each desired width of the conveyor belt 10. In the alternative, each link assembly 12 could comprise one section having a predetermined number of links 48 positioned near a similar section having the same or a different number of links 48 and, in this manner, various lengths of sections 12 could be interconnected to form different widths. However, in this last mentioned instance, the separations between the various sections reduces the overall structural strength of the conveyor belt 10 so constructed.

Figure 8:
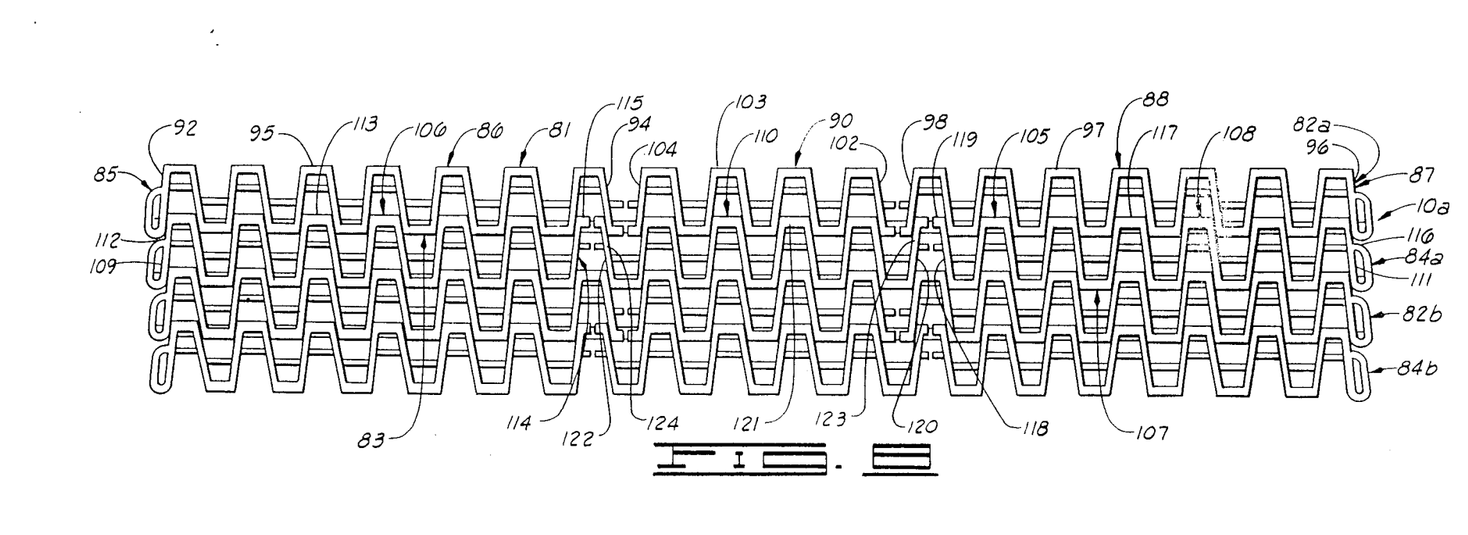
FIG. 8 is a bottom plan view similar to FIG. 1, but showing a modified conveyor belt wherein each link assembly is constructed of modules which are constructed in accordance with the present invention.

In one embodiment and as shown in FIG. 8, the conveyor belt 10a is formed from a plurality of interconnected first and second link assemblies 82 and 84. Four link assemblies are shown in FIG. 8 and designated therein by the reference numerals 84a, 84b, 82a and 82b. The link assemblies 82 and 84 are alternately spaced over the length of the conveyor belt 10a.

Each first link assembly 82 has a forward end 81, a rearward end 83, a first side 85, and a second side 87, as shown in FIG. 8 (only one of the first link assemblies 82a has the forward end 81, the rearward end 83, the first side 85 and the second side 87 designated by specific reference numerals in FIG. 8). Each first link assembly 82 has a first shaft opening formed through a portion of the forward end 81 thereof and a second shaft opening formed through a portion of the rearward end 83 thereof in a manner exactly like that described before with respect to the first and the second shaft openings 22 and 24 of the link assemblies 12.

The first link assembly 82 comprises a first end module 86, a second end module 88 and one intermediate module 90 interposed between the first and the second end modules 86 and 88. The modules 86, 88 and 90 are positioned in an end-to-end relationship to form the first link assembly 82.

The first end module 86 has a first end 92 and a second end 94 and comprises a plurality of links 95 (only one of the links 95 being designated by a reference numeral in FIG. 8). Each of the links 95 is constructed exactly like the links 48 described before with respect to the link assemblies 12 and each of the links 95 in the first end module 82 comprises what is sometimes is referred to herein as a "whole link". The second end 94 of the first end module 86 is formed by a half connecting member, like the connecting the member 68 described before with respect to the link assemblies 12.

The second end module 88 has a first end 96 and a second end 98. The second end module 88 comprises a plurality of links 97 (only one of the links 97 being designated by a specific reference numeral in FIG. 8). Each of the links 97 is constructed and operates exactly like the links 48 described before with respect to the link assemblies 12 and each of the links 97 has a first shaft opening (not shown) and a second shaft opening (not shown) formed therethrough in a manner exactly like the first and the second shaft openings 22 and 24 of the link assemblies 12 described in detail before. Each of the links 97 in the second end module 88 is a whole link and the second end 98 of the second end module 88 is formed by one half of a connecting member like the connecting member 68 described in detail before with respect to the link assemblies 12.

The intermediate module 90 has a first and 102 and a second end 104. The intermediate module 90 comprises a plurality of links 103 and each of the links 103 is formed exactly like the links 48 described before (only one of the links 103 being designated by a specific reference numeral in FIG. 8). The first end 102 of the intermediate module 90 is formed by one half of a connecting member like the connecting members 68 described in detail before with respect to the link assembly 12. The second end 104 of the intermediate module 90 is formed by one-half of a connecting member like the connecting member 68 described in detail before with respect to the link assemblies 12.

In an assembled position of the first link assembly 82, the second end 94 of the first end module 86 is disposed near and spaced a distance from the second end 104 of the intermediate module 90 and the first end 102 of the intermediate module 90 is disposed near and spaced a distance from the second end 98 of the second end module 88. In this position, the first end 92 of the first end module 86 forms the first side of the first link assembly 82 and the first end 96 of the second end module 88 forms the second side 87 of the first link assembly 82.

Each second link assembly 84 has a forward end 106, a rearward end 107, a first side 109 and a second side 111. Only the ends 105 and 107 and the sides 109 and 111 of the second link assembly 84a are designated by specific reference numerals in FIG. 8.

Each second link assembly 84 comprises a first end module 106, a second end module 108 and an intermediate module 110.

The first end module 106 has a first end 112 and a second end 114. The first end module 106 comprises a plurality of links 113 (only one of the links 113 being designated by specific reference numeral in FIG. 8). Each of the links 113 is formed and shaped exactly like the links 48 described in detail before with respect to the link assembly 12, except the link 113 forming the second end 114 of the first end module 106 comprises what is sometimes referred to herein as a half link and the half link forming the second end 114 of the first end module 106 is designated in FIG. 8 by the specific reference numeral 115. The half link 115 comprises one-half of a whole or full link 113.

The second end module 108 has a first end 116 and a second end 118. The second end module 108 comprises a plurality of links 117 (only one of the links 117 being designated by a specific reference numeral in FIG. 8) and the links 117 are constructed exactly like the links 48 described in detail before with respect to the link assembly 12 except the link forming the second end 118 of the second end module 108 more particularly comprises a half link and the half link forming the second end 118 of the second end module 108 is specifically designated in FIG. 8 by the reference numeral 119. The half link 119 forming the second end 118 of the second end module 108 comprises one-half of a whole or full link 117.

The intermediate module 110 has a first end 120 and a second end 122. The intermediate module 110 comprises a plurality of links 121 and each of the links 121 is formed exactly like the links 48 described in detail before with respect to the link assembly 12, except the link forming the first end 120 comprises a half link and is designated in FIG. 8 by the specific reference numeral 123 and the link forming the second end 122 more particularly comprises a half link and is designated in FIG. 8 by the specific reference numeral 124. The half links 123 and 124 forming the first and the second ends 120 and 122, respectfully, of the intermediate module 110 comprise about one-half of a whole link 121.

In an assembled position, the first end module 106, the second module 108 and the intermediate module 110 of each second link assembly 84 are placed in an end-to-end relationship to form the second link assembly 84. More particularly, the second end 114 of the first end module 106 is disposed near and spaced a distance from the second end 122 of the intermediate module 110 and the first end 120 of the intermediate module 110 is disposed near and spaced a distance from the second end 118 of the second end module 108. The first end 112 of the first end module 106 cooperates to form the first side 109 of the second link assembly 84 and the first end 116 of the second end module 108 cooperates to form the second side 111 of the second link assembly 84.

With the modules 86, 88 and 90 placed in this end-to-end relationship to form the first link assembly 82 and with the modules 106, 108 and 110 placed in this end-to-end relationship to form the second link assembly 84, the forward end 105 of the second link assembly 84 is disposed near the rearward end 83 of the first link assembly 82 so that the links 113, 115, 117, 119, 121, 123 and 124 each are disposed in one of the link openings formed by the links 95, 97 and 103 in the first link assembly 82 and a link shaft is disposed through the first shaft opening in the second link assembly 84 and through the second shaft opening in the first link assembly 82 to connect the first and the second link assemblies 82 and 84 together in an assembled position in a manner like that described before with respect to the link assemblies 12, the link shafts 26 and the link openings 58.

When the link assemblies 82 and 84 are formed in the manner just described with modules 86, 88 and 90 in the first link assembly 82 comprising whole links and with the modules 106, 108 and 110 in the second link assemblies 84 comprising whole links with ends formed of half links, every other or alternate row of links interconnected by link shafts comprises only whole links connected to whole links, as shown in FIG. 8 thereby providing an increased overall structural integrity in the conveyor belt 10 since only every other or alternate row of interconnected links includes spaces between modules forming the link assemblies 82 and 84.

Figures 11, 13:
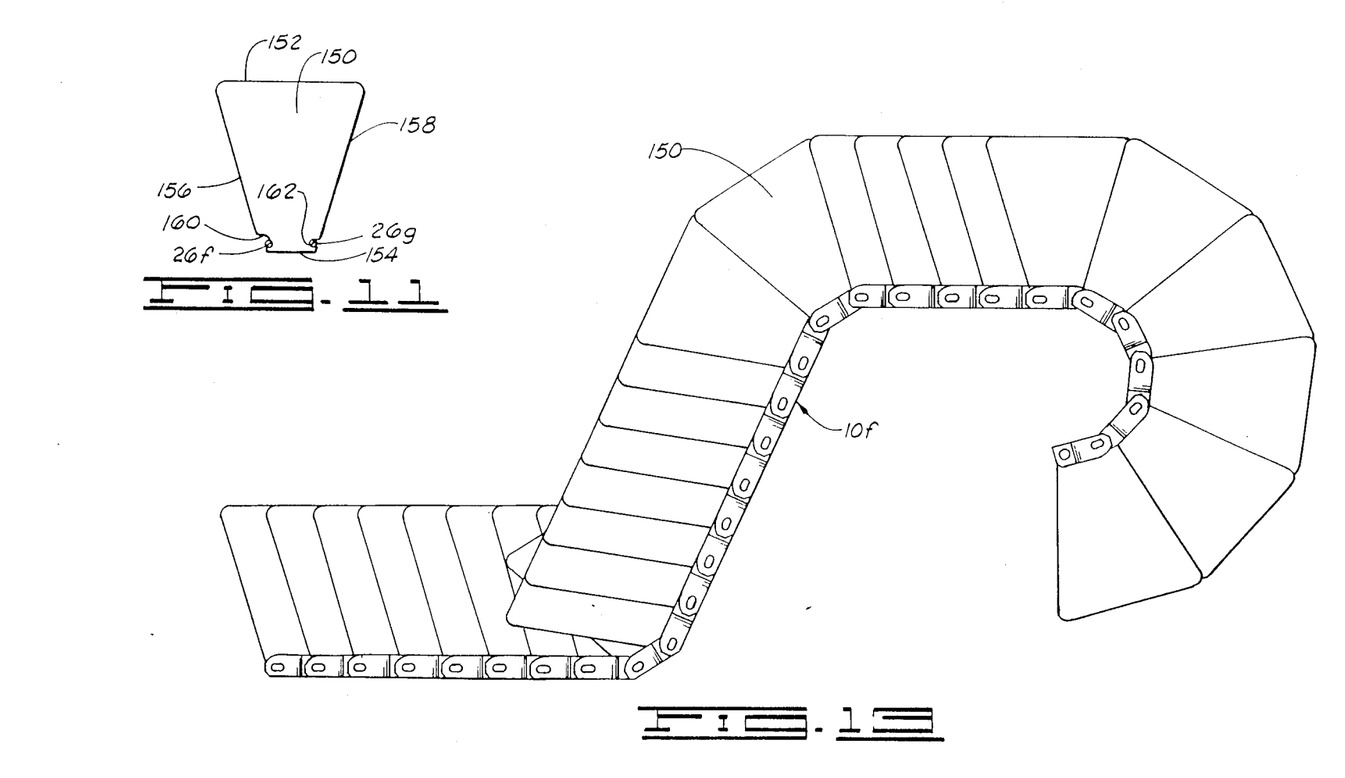
FIG. 11 is a side elevational view of a side guard which is constructed in accordance with the present invention.
FIG. 13 is a side elevational view of a conveyor belt with a plurality of side guards positioned thereon.

Shown in FIG. 11 is a side guard 150 which is constructed in accordance with the present invention. The side guard 150 has an upper end 152, a lower end 154, a first side 156 and an opposite second side 158. The sides 156 and 158 each are tapered outwardly as the sides 156 and 158 extend upwardly from the lower end 154. The upper end 152 is wider than the lower end 154.

A first notch 160 is formed in the first side 156 generally near the lower end 154. The first notch 160 is shaped to receive a link shaft 26, and the first notch 160 extends over a distance slightly larger than the diameter of the link shaft 26.

A second notch 162 is formed in the second side 158 generally near the lower end 154. The second notch 162 is shaped to receive a link shaft 26, and the second notch 162 is formed on a radius slightly larger than the radius of the link shaft 26.

Figure 12:
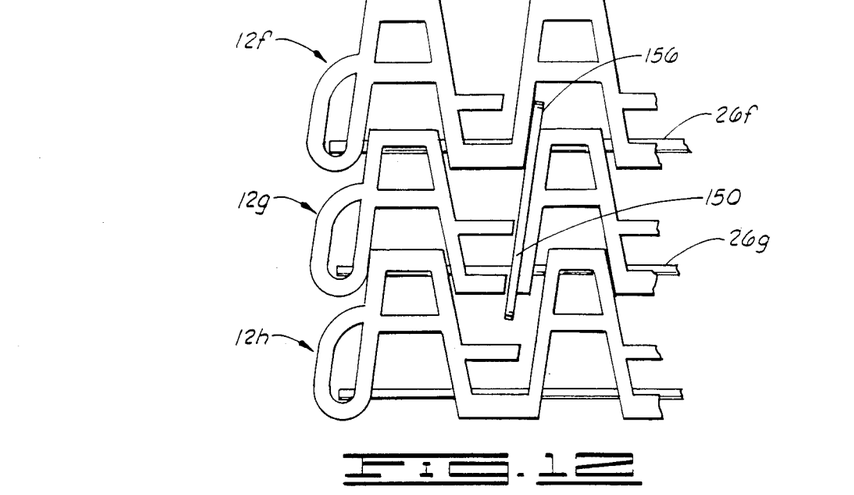
FIG. 12 is a top plan view of the side guard of FIG. 11 on a conveyor constructed like FIG. 1.

Shown in FIG. 12 is a portion of three link assemblies 12$f$, 12$g$ and 12$h$ each of which are constructed like the link assemblies 12 described before. The three link assemblies 12$f$, 12$g$ and 12$h$ are connected together by the link shafts 26$f$ and 26$g$.

As shown in FIG. 12, one side guard 150 has been assembled to the link shafts 26$f$ and 26$g$. To assemble the side guard 150, the lower end 154 is positioned generally over the link shafts 26$f$ and 26$g$, and the lower end 154 then is moved in the downward direction toward the link shafts 26$f$ and 26$g$ until the link shaft 26$g$ snaps into the second notch 162. The side guard 150 then is bent slightly until the shaft 26$f$ is positioned generally within the first notch 160. The side guard 150 then is released and the side guard 150 springs back into the original unbent shape thereby positioning the link shaft 26$f$ within the first notch 160.

Shown in FIG. 13, a plurality of side guards 150 are connected to the conveyor belt 10$f$ (only one side guard 150 being designated by a reference numeral in FIG. 13). The conveyor belt 10$f$ is shown in FIG. 13 in various positions for the purpose of illustrating the positioning of the side guards 150.

In operation, if one or more side guards 150 becomes damaged or knocked off, it is not necessary to disassemble the conveyor belt 10$f$ to install new side guards 150. The side guards 150 merely are snapped into position in the manner described before. In a like manner, if one or more side guards 150 becomes damaged, the damaged side guard 150 can be removed by simply bending the side guard 150 in the reverse manner as described before and pulling upwardly on the side guard 150 to snapingly dislodge the shafts 26$f$ and 26$g$ from the respective notch 160 and 162.

Figure 14:
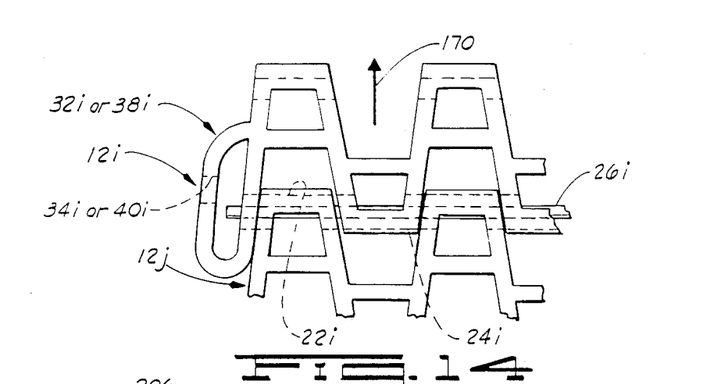
FIG. 14 is a top plan view of a conveyor belt constructed like FIG. 1, showing a headless link shaft.

Shown in FIG. 14 is a pair of link assemblies 12$i$ and 12$j$ which are constructed exactly like the link assemblies 12 described in detail before except as described below. The link assemblies 12$i$ and 12$j$ include aligned shaft openings 22$i$ and 24$i$ positioned and shaped as described before for accommodating a link shaft 26$i$.

The link assemblies 12$i$ and 12$j$ each include first and second guards 32$i$ and 38$i$ which are constructed like the guards 32 and 38 described before, except the access openings 34$i$ and 40$i$ each are offset with respect to the shaft openings 24$i$. The offset openings 34$i$ and 40$i$ and 24$i$ are elongated. The openings 34$i$ and 40$i$ each include a lower portion which is aligned with the upper portion of the openings 24$i$, and these aligned portions are sized to receive the link shaft 26$i$.

To install the link shaft 26$i$, the link assembly 12$j$ is pushed upwardly in a general direction 170 to a position wherein the openings 22$i$ are aligned with the aligned portions of the openings 34$i$ or 40$i$ and 24$i$. In this position, the link shaft 26$i$ is inserted through the opening 34$i$ or 40$i$ and through the openings 22$i$ and 24$i$. After installing the link shaft 26$i$, the link assembly 12$j$ moves back to the position shown in FIG. 14 with respect to the link assembly 12$i$ and the link shaft 26$i$ is prevented by the guard 32$i$ or 38$i$ from moving out the opening 34$i$ or 40$i$ since link shaft 26$i$ is not aligned with the opening 34$i$ or 40$i$. When formed in this manner, it no longer is necessary to form a head on the ends of the link shafts 26, such as the shaft heads 44 and 46.

As mentioned before, when the conveyor belt 10 is placed in tension, the link shafts 12 tend to be moved apart and the link shafts 26 are bent in the sine wave like shape, as described before in connection with FIG. 7.

The conveyor belt 10 constructed of plastic or ceramic link assemblies 12 and plastic or ceramic link shafts 26 stretch and lengthen when placed in tension. In one embodiment, it was found that the conveyor belt 10 lengthened about one-eighth of an inch per foot of conveyor belt length. In operation, if the conveyor belt 10 was forty feet long and placed over two spaced apart sprockets, one could use a conveyor belt 10 constructed in accordance with the present invention having an unstretched length of about forty feet less forty feet times one-eight of an inch divided by 12 inches. The conveyor belt 10 then is stretched about the sprockets in an assembled position. The stretched conveyor belt 10 reduces catenary sag and belt sag near the sprocket resulting from thermal and or moisture expansion during operation of the conveyor belt 10.

Figure 15:
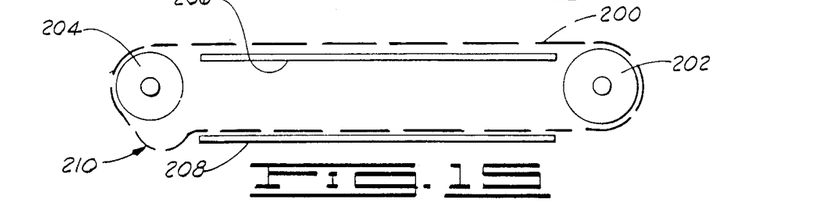
FIG. 15 is a schematic view showing a prior art conveyor belt extending about two sprockets, which has been elongated.

Shown schematically in FIG. 15 is a prior art conveyor belt 200 (shown in dashed lines) assembled about a pair of sprockets 202 and 204. The conveyor belt 200 is supported between the sprockets 202 and 204 by a pair of supports 206 and 208. As illustrated, the conveyor belt 200 has been expanded due to thermal or moisture expansion. A belt sag 210 is formed generally near the sprocket 204. A conveyor belt constructed in accordance with the present invention substantially reduces the opportunity of encountering such a belt sag.

Figure 16:
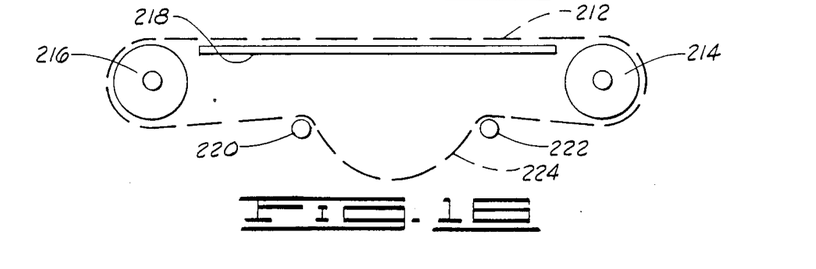
FIG. 16 is another schematic view showing a prior art conveyor belt extending about two sprockets which has been elongated.

Shown schematically in FIG. 16, a prior art conveyor belt 212 is assembled about two sprockets 214 and 216. The conveyor belt 212 is supported by a support 218 and the conveyor belt 212 is supported on the underside by a pair of cylindrically shaped supports 220 and 222. If the conveyor belt 212 expands during operation, a catenary sag 224 occurs. A conveyor belt constructed in accordance with the present invention eliminates this type of catenary sag.

The link shafts described herein preferably are constructed of a resilient material such as plastic or ceramic. The link assemblies also are constructed of plastics or ceramics. A conveyor belt constructed in this manner will lengthen without substantial deformation resulting in a permanent set in or destruction of portions of the link assemblies or the link shafts.

Changes maybe made in the construction and the operation of the various components, assemblies and elements described herein and changes may be made in the steps or the sequence of steps of the methods described herein without departing from the spirit and the scope of the invention as defined in the following claims.

I claim:

1. A conveyor belt having opposite sides comprising:
   a plurality of link assemblies each link assembly having a forward end, a rearward end, a first side and a second side, a first shaft opening extending through the forward end of each link assembly and a second shaft opening extending through the rearward end of each link assembly;
   a plurality of link shafts, each link shaft extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and
   a plurality of first guards, each first guard extending generally over the first end of one of the link shafts, the first guards cooperating for protecting the first ends of the link shafts and substantially preventing the first ends of the link shafts from engaging objects during the operation of the conveyor belt, one end of each first guard being connected to the first end of one of the link assemblies and each first guard extending along substantially about the entire length of the first side of one of the link assemblies with the opposite end of each first guard being connected to the first side of one of the link assemblies whereby the first guards cooperate to form a substantially continuous surface extending along one side of the conveyor belt when the link assemblies are connected via the link shafts to form the conveyor belt.

2. The conveyor belt of claim 1 defined further to comprise:
   a plurality of second guards, each second guard being connected to the second side of one of the link assemblies and each second guard extending generally over the second end of one of the link shafts, the second guards cooperating for protecting the second ends of the link shafts and substantially preventing the second ends of the link shafts from engaging objects during the operation of the conveyor belt, one end of each second guard being connected to the second end of one of the link assemblies and each second guard extending along substantially about the entire length of the second side of one of the link assemblies with the opposite end of each second guard being connected to the second side of one of the link assemblies whereby the second guards cooperate to form a substantially continuous surface extending along one side of the conveyor belt when the link assemblies are connected via the link shafts to form the conveyor belt.

3. The conveyor belt of claim 1 wherein each first guard is defined further to include an access opening, each access opening being generally aligned with the first end of one of the link shafts for providing access to the first ends of the link shafts for cooperating in forming a shaft head on each of the first ends of the link shafts to retain the link shaft in an assembled position connected to the adjacent link assemblies and to facilitate visual inspection of the first ends of the link shafts.

4. The conveyor belt of claim 3 defined further to comprise:
   a plurality of second guards, each second guard being connected to the second side of one of the link assemblies and each second guard extending generally over the second end of one of the link shafts, the second guards cooperating for protecting the second ends of the link shafts and substantially preventing the second ends of the link shafts from engaging objects during the operation of the conveyor belt, one end of each second guard being connected to the second end of one of the link assemblies and each second guard extending along substantially about the entire length of the second side of one of the link assemblies with the opposite end of each second guard being connected to the second side of one of the link assemblies whereby the second guards cooperate to form a substantially continuous surface extending along one side of the conveyor belt when the link assemblies are connected via the link shafts to form the conveyor belt.

5. The conveyor belt of claim 4 wherein each second guard is defined further to include an access opening, generally aligned with the second end of one of the link shafts for providing access to the second ends of the link shafts for cooperating and forming a shaft head on each of the second ends of the link shafts to retain the link shafts in an assembled position connected to the adjacent link assemblies.

6. The conveyor belt of claim 1 wherein each link assembly is defined further to comprise:
a plurality of links, each link having a first side, a second side, a forward end and a rearward end, a link opening being formed through the rearward end of each link and extending generally between the first and the second sides, each link opening in one of the link assemblies being shaped and adapted to receive a portion of the forward end of one of the links in an adjacent link assembly, a first forward link shaft opening being formed through the first side of each link generally near the forward end of the link, and second forward link shaft opening being formed through the second side of each link generally near the forward end of the link, the first and the second forward link shaft openings being aligned and sized to receive one of the link shafts and cooperating to form the first shaft opening, a first rearward link shaft opening being formed through the first side of each link generally near the rearward end of each link and a second rearward link shaft opening being formed through the second side of each link generally near the rearward end of each link, the first and the second rearward link shafts openings being aligned and sized to receive one of the link shafts and cooperating to form the second shaft opening; and
means for connecting the second side of each link in one of the link assemblies to the first side of an adjacent link in the one link assembly to form a row of links in each link assembly with the forward ends of each link cooperating to form the forward end of the link assembly and the rearward ends of each link cooperating to form the rearward end of the link assembly and the first side of one of the links forming the first side of the link assembly and the second side of one of the links forming the second side of the link assembly.

7. The conveyor belt of claim 6 wherein each link is further defined as being generally U-shaped.

8. The conveyor belt of claim 6 wherein each link is defined further to comprise:
a plurality of link braces, each link brace having one end connected to the first side of one link and an opposite end connected to the second side of the one link, each link brace extending generally between the first and the second sides of one of the links and cooperating to provide a additional structural strength to each link for maintaining the first and the second sides of each link in a separated position with the first side being separated and spaced a distance from the second side of each link.

9. The conveyor belt of claim 6 wherein the means for connecting the second side of each link in one of the link assemblies to the first side of an adjacent link in the one link assembly to form a row of links is defined further to comprise:
a plurality of connecting members, each connecting member having one end connected to the second side of one link generally near the rearward end and an opposite end connected to the first side of the adjacent link generally near the rearward end.

10. The conveyor belt of claim 1 wherein each first shaft opening is defined further as being an elongated opening having a forward end formed on a radius larger than a radius of the link shafts and providing a shaft rocking surface within each first shaft opening, each link shaft being disposed generally adjacent the shaft rocking surface formed on one of the first shaft openings, and the shaft rocking surfaces rolling on the link shaft during the operation of the conveyor belt for substantially reducing rotating friction between the link shaft and adjacent portions of the link assemblies.

11. The conveyor belt of claim 10 wherein the shaft rocking surface in each of the first shaft opening is defined further as extending over a distance sufficient so that the link shaft rolls on the shaft rocking surface when the conveyor belt moves over a curved path, and wherein the shaft rocking surface formed on the second shaft opening is defined further as extending over a distance sufficient so that the link shaft rolls on the shaft rocking surface when the conveyor belt moves over a curved path.

12. The conveyor belt of claim 10 wherein the shaft rocking surface formed in the first shaft opening as defined further as extending over a distance larger than the diameter of the link shaft.

13. A conveyor belt, comprising:
a plurality of link assemblies, each link assembly having a forward end, a rearward end, a first side and a second side, a first shaft opening extending through the forward end of each link assembly and a second shaft opening extending through the rearward end of each link assembly;
a plurality of link shafts, each link shaft extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and
wherein each shaft opening being an elongated opening having a forward end formed on a radius larger than a radius of the link shafts and providing a shaft rocking surface within each first shaft opening, each link shaft being disposed generally adjacent the shaft rocking surface formed on one of the first shaft openings, and the link shafts rolling on the shaft rocking surface during the operation of the conveyor belt for substantially reducing rotating friction between the link shaft and adjacent portions of the link assemblies, the radius of each shaft rocking surface being sufficiently large so each shaft rocking surface approximates a flat surface while still being formed on a curve; and
a plurality of first guards, each first guard being connected to the first side of one of the link assemblies and each first guard extending generally over the first end of one of the link shafts, the first guards cooperating for protecting the first ends of the link shafts and substantially preventing the first ends of the link shafts from engaging objects during the operation of the conveyor belt.

14. A conveyor belt, comprising:
a plurality of link assemblies, each link assembly having a forward end, a rearward end, a first side and a second side, a first shaft opening extending through the forward end of each link assembly and a second shaft opening extending through the rearward end of each link assembly, each link assembly comprising:
a plurality of first link assemblies with each first link assembly having a forward end, a rearward end, a first side and a second side, and a plurality of second link assemblies with each second link assembly having a forward end, a rearward end, a first side and a second side, and wherein each first link assembly is disposed generally between two adjacent second link assemblies, the first and the second link assemblies being alternately positioned over the length of the conveyor belt, the forward end of each second link assembly being disposed near the rearward end of the adjacent first link assembly in an assembled portion of the first and second link assemblies to form the conveyor belt, each first link assembly comprising:
  a first end module having a first end and a second end and comprising a plurality of links; and
  a second end module having a first end and a second end and comprising a plurality of links, the second end of the second end module being disposed generally near the second end of the first end module in an assembled position of the first link assembly; and
wherein each second link assembly comprises:
  a first end module having a first end and a second end and comprising a plurality of links, the last link in the first end module forming the second end of the first end module comprising about a one-half link; and
  a second end module having a first end and a second end and comprising a plurality of links, the last link in the second end module forming the second end of the second end module comprising about a one-half link, the second end of the first end module being disposed generally near the second end of the second end module in an assembled position of the second link assembly whereby alternate rows of interconnected links in the conveyor belt do not include any spaced apart second ends between the first and second end modules in either the first or second link assemblies;
  a plurality of link shafts, each link shaft extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and
  a plurality of first guards, each first guard being connected to the first side of one of the link assemblies and each first guard extending generally over the first end of one of the link shafts, the first guards cooperating for protecting the first ends of the link shafts and substantially preventing the first ends of the link shafts from engaging objects during the operation of the conveyor belt.

15. The conveyor belt of claim 14 wherein each link in the first end module in each first link assembly is defined further as having a first side, a second side, a forward end and a rearward end, a link opening being formed through the rearward end of each link and extending generally between the first and the second sides thereof, and wherein each link in the second end module in each first link assembly is defined further as having a first side, a second side, a forward end and a rearward end, a link opening being formed through the rearward end of each link and extending generally between the first and the second sides thereof, and wherein each link in the first end module in each second link assembly is defined further as having a first side, a second side, a forward end and a rearward end, a link opening being formed through the rearward end of each link and extending generally between the first and the second sides thereof, each half link in the first end modules in the second link assemblies comprising a first side, a forward end and a rearward end, a portion of a link opening being formed through the rearward end of each half link, and wherein each link in the second end module in each second link assembly is defined further as having a second side, a forward end and a rearward end, a portion of a link opening being formed through the rearward end of the half link, the half link in the first end module being disposed near the half link in the second end module in an assembled position of the first and the second end modules to form the second link assembly so the two half links cooperate to combine to form a whole link.

16. A conveyor belt, comprising:
  a plurality of link assemblies, each link assembly having a forward end, a rearward end, a first side and a second side, a first shaft opening extending through the forward end of each link assembly and a second shaft opening extending through the rearward end of each link assembly, wherein each link assembly comprises:
  a plurality of first link assemblies with each first link assembly having a forward end, a rearward end, a fist side and a second side, and a plurality of second link assemblies with each second link assembly having a forward end, a rearward end, a first side and a second side, and wherein each first link assembly is disposed generally between two adjacent second link assemblies, the first and the second link assemblies being alternately positioned over the length of the conveyor belt, the forward end of each second link assembly being disposed near the rearward end of the adjacent first link assembly in an assembled position of the first and second link assemblies to form the conveyor belt, each first link assembly comprising:
  a first end module having a first end and a second end and comprising a plurality of links; and
  a second end module having a first end and a second end and comprising a plurality of links; and
  at least one intermediate module, each intermediate module having a first end and a second end and comprising a plurality of links, each intermediate link module being positioned in an end-to-end relationship with respect to the other intermediate modules so that the first end of one of the intermediate modules forms the first end of an assembled intermediate modules and the second end of one of the intermediate modules forms the second end of the assembled intermediate modules, the second end of the assembled intermediate modules being disposed near the first end of the first end module and the first end of the assembled intermediate modules being positioned near the second end of the second end module in an assembled position of the first and second end modules and the intermediate modules to form the first link assembly;
wherein each second link assembly comprises:
  a first end module having a first end and a second end and comprising a plurality of links, the last link in the first end module forming the second end of the first end module comprising about a one-half link;

a second end module having a first end and a second end and comprising a plurality of links, the last link in the second end module forming the second end of the second end module comprising about a one-half link; and at least one intermediate module, each intermediate module having a first end and a second end and comprising a plurality of links, the link in each intermediate module forming the first end comprising about one-half link and the link in each intermediate module forming the second end comprising about a one-half link, the intermediate link modules being positioned in an end-to-end relationship to form assembled intermediate modules so that the first end of one of the intermediate modules forms the first end of the assembled intermediate modules and the second end of one of the intermediate modules forms the second end of the assembled intermediate modules, the first end of the assembled intermediate modules being positioned near the second end of the first end module and the second end of the assembled intermediate modules being positioned near the second end of the second end module whereby alternate rows of interconnected links in the conveyor belt do not include any spaced apart ends between the first and the second end module or intermediate modules;

a plurality of link shaft, each link shaft extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and a plurality of first guards, each first guard being connected to the first side of one of the link assemblies and each first guard extending generally over the first end of one of the link shafts, the first guards cooperating for protecting the first ends of the link shafts and substantially preventing the first ends of the link shafts from engaging objects during the operation of the conveyor belt.

17. The conveyor belt of claim 16 wherein each link in the first end module in each first link assembly is defined further as having a first side, a second side, a forward end and a rearward end, a link opening being formed through the rearward end of each link and extending generally between the first and the second sides thereof, and wherein each link in the second end module in each first link assembly is defined further as having a first side, a second side, a forward end and a rearward end, a link opening being formed through the rearward end of each link and extending generally between the first and the second sides thereof, and wherein each link in each intermediate module in each first link assembly is defined further as having a first side, a second side, a forward end and a rearward end, a link opening being formed through the rearward end of each link and extending generally between the first and the second sides thereof, and wherein each link in the first end module in each second link assembly is defined further has having a first side, a second side, a forward end and a rearward end, a link opening being formed through the rearward end of each link and extending generally between the first and the second sides thereof and wherein the half link has a first side, a forward end and a rearward end, a portion of a link opening being formed through the rearward end of the link and extending generally between the first and the second sides thereof, and wherein each link in the second end module of each second link assembly is defined further as having a first side, a second side, a forward end and a rearward end, a link opening being formed through the rearward end and extending generally between the first and the second sides thereof, the one half link having a second side, a forward end and a rearward end, a portion of a link opening being formed through the rearward end of the half link, and wherein each link in each intermediate link module in each second link assembly is defined further has having a first side, a second side, a forward end and a rearward end, a link opening being formed through the rearward end of each link and extending generally between the first and the second sides thereof, each half link being defined further as having at least one of a first and a second side and having a forward end and a rearward end, a portion of a link opening being formed through the rearward end.

18. A conveyor belt, comprising:

a plurality of link assemblies, each link assembly having a forward end, a rearward end, a first side and a second side, a first shaft opening extending through the forward end of each link assembly and a second shaft opening extending through the rearward end of each link assembly, each link assembly comprising:

a plurality of first link assemblies with each first link assembly having a forward end, a rearward end, a first side and a second side, and a plurality of second link assemblies with each second link assembly having a forward end, a rearward end, a first side and a second side, and wherein each first link assembly is disposed generally between two adjacent second link assemblies, the first and the second link assemblies being alternately positioned over the length of the conveyor belt, the forward end of each second link assembly being disposed near the rearward end of the adjacent first link assembly in an assembled position of the first and the second link assemblies to form the conveyor belt, each first link assembly comprising:

a first end module having a first end and a second end and comprising a plurality of links; and a second end module having a first end and a second end and comprising a plurality of links; and an intermediate module having a first end and a second end and comprising a plurality of links, the second end of the intermediate module being disposed near the second end of the first end module and the first end of the intermediate module being disposed near the second end of the second end module in an assembled position of the first and the second end modules and the intermediate module to form the first link assembly; and wherein each second link assembly is defined further as comprising:

a first end module having a first end and a second end and comprising a plurality of links, the link forming the second end of the first end module comprising about a one-half link;

a second end module having a first end and a second end and comprising a plurality of links, the link forming the second end of the second end module comprising about a one-half link; and an intermediate module having a first end and a second end and comprising a plurality of links, the link forming the first end of the intermediate module comprising about one-half link and the end forming the second end of the intermediate module comprising about a one-half link, the first end of the intermediate module being disposed near the second end of the second end module and the second end of the intermediate module being disposed near the second end of the first end module in an assembled position of the first and the second end modules and the intermediate module to form the second link assembly whereby alternate rows of interconnected links in the conveyor belt do not include any spaced apart ends between the first and the second end modules or intermediate modules;

a plurality of link shafts, each link shaft extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and a plurality of first guards, each first guard being connected to the first side of one of the link assemblies and each first guard extending generally over the first end of one of the link shafts, the first guards cooperating for protecting the first ends of the link shafts and substantially preventing the first ends of the link shafts from engaging objects during the operation of the conveyor belt.

19. The conveyor belt of claim 18 wherein each link in the first end module in each first link assembly is defined further as having a first side, a second side, a forward end and a rearward end, a link opening being formed through the rearward end of each link and extending generally between the first and the second sides thereof, and wherein each link in the second end module in each first link assembly is defined further as having a first side, a second side, a forward end and a rearward end, a link opening being formed through the rearward end of each link and extending generally between the first and the second sides thereof, and wherein each link in the intermediate module in each first link assembly is defined further as having a first side, a second side, a forward end and a rearward end, a link opening being formed through the rearward end of each link and extending generally between the first and the second sides thereof, and wherein each link in the first end module in each second link assembly is defined further has having a first side, a second side, a forward end and a rearward end, a link opening being formed through the rearward end of each link and extending generally between the first and the second sides thereof and wherein the half link has a first side, a forward end and a rearward end, a portion of a link opening being formed through the rearward end of the link and extending generally between the first and the second sides thereof, and wherein each link in the second end module of each second link assembly is defined further as having a first side, a second side, a forward end and a rearward end, a link opening being formed through the rearward end and extending generally between the first and the second sides thereof, the one half link having a second side, a forward end and a rearward end, a portion of a link opening being formed through the rearward end of the half link, and wherein each link in the intermediate link module in each second link assembly is defined further has having a first side, a second side, a forward end and a rearward end, a link opening being formed through the rearward end of each link and extending generally between the first and the second sides thereof, each half link being defined further as having at least one of a first and a second side and having a forward end and a rearward end, a portion of a link opening being formed through the rearward end.

20. The conveyor belt of claim 1 wherein the link assemblies and link shafts each are defined further as being constructed of a resilient material comprising plastic or ceramic.

21. A conveyor belt comprising:
a plurality of first link assemblies each first link assembly having a forward end, a rearward end, a first side and a second side, a first shaft opening extending through the forward end of each first link assembly and a second shaft opening extending through the rearward end of each first link assembly each first link assembly, comprising:

a first end module having a first end and a second end and comprising a plurality of links; and a second end module having a first end and a second end and comprising a plurality of links, the second end of the second end module being disposed near the second end of the first end module in an assembled position of the first and the second end modules to form the first link assembly; and a plurality of second link assemblies, each second link assembly having a forward end, a rearward end, a first side and a second side, a first shaft opening extending through the forward end of each second link assembly and a second shaft opening extending through the rearward end of each second link assembly, each second link assembly comprising:

a first end module having a first end and a second end and comprising a plurality of links, the last link in the first end module forming the second end of the first end module comprising about a one-half link; and a second end module having a first end and a second end and comprising a plurality of links, the last link in the second end module forming the second end of the second end module comprising about a one-half link, the second end of the first end module being disposed generally near the second end of the second end module in an assembled position of the second link assembly whereby alternate rows of interconnected links in the conveyor belt do not include any spaced apart second ends between the first and the second end modules in either the first or the second link assembly.

22. The conveyor belt of claim 21 wherein each link in the first end module in each first link assembly is defined further as having a first side, a second side, a forward end and a rearward end, a link opening being formed through the rearward end of each link and extending generally between the first and the second sides thereof, and wherein each link in the second end module in each first link assembly is defined further as having a first side, a second side, a forward end and a rearward end, a link opening being formed through the rearward end of each link and extending generally between the first and the second sides thereof, and wherein each link in the first end module in each second link assembly is defined further as having a first side, a second side, a forward end and a rearward end, a link opening being formed through the rearward end of each link and extending generally between the first and the second sides thereof, each half link in the first end modules in the second link assemblies comprising a first side, a forward end and a rearward end, a portion of a link opening being formed through the rearward end of each half link, and wherein each link in the second end module in each second link assembly is defined further as having a second side, a forward end and a rearward end, a portion of a link opening being formed through the rearward end of the half link, the half link in the first end module being disposed near the half link in the second end module in an assembled position of the first and the second end modules to form the second link assembly so the two half links cooperate to combine to form a whole link.

23. The conveyor belt of claim 21 defined further to include:
a plurality of link shafts, each link shaft extending through the first shaft opening in one of the first or second link assemblies and through the second shaft opening in an adjacent one of the first and second link assemblies for connecting the link assemblies.

24. The conveyor belt of claim 21 wherein the first link assemblies, the second link assemblies and the link shafts each are defined further as being constructed of a resilient material comprising a plastic or ceramic.

25. A conveyor belt comprising:
a plurality of first link assemblies with each first link assembly having a forward end, a rearward end, a first side and a second side, and a plurality of second link assemblies with each second link assembly having a forward end, a rearward end, a first side and a second side, and wherein each first link assembly is disposed generally between two adjacent second link assemblies, the first and the second link assemblies being alternately positioned over the length of the conveyor belt, the forward end of each second link assembly being disposed near the rearward end of the adjacent first link assembly in an assembled position of the first and second link assemblies to form the conveyor belt, and wherein the first link assembly comprises:
a first end module having a first end and a second end and comprising a plurality of links; and
a second end module having a first end and a second end and comprising a plurality of links; and
at least one intermediate module, each intermediate module having a first end and a second end and comprising a plurality of links, each intermediate module being positioned in an end-to-end relationship with respect to the other intermediate modules so that the first end of one of the intermediate modules forms the first end of an assembled intermediate modules and the second end of one of the intermediate modules forms the second end of the assembled intermediate modules, the second end of the assembled intermediate modules being disposed near the second end of the first end module and the first end of the assembled intermediate modules being disposed near the second end of the second end module in an assembled position of the first and the second end modules and the intermediate modules to form the first link assembly; and wherein each second link assembly is defined further as comprising:
a first end module having a first end and a second end and comprising a plurality of links, the link forming the second end of the first end module comprising about a one-half link;
a second end module having a first end and a second end and comprising a plurality of links, the link forming the second end of the second end module comprising about a one-half link; and
at least one intermediate module, each intermediate module having a first end and a second end and comprising a plurality of links, the link in each intermediate module forming the first end comprising about one-half link and the link in each intermediate module forming the second end comprising about a one-half link, the intermediate link modules being positioned in an end-to-end relationship to form assembled intermediate modules so that the first end of one of the intermediate modules forms the first end of the assembled intermediate modules and the second end of one of the intermediate modules forms the second end of the assembled intermediate modules, the first end of the assembled intermediate modules being positioned near the second end of the first end module and the second end of the assembled intermediate modules being positioned near the second end of the second end module whereby alternate rows of interconnected links in the conveyor belt do not include any spaced apart ends between the first and the second end module or intermediate modules.

26. The conveyor belt of claim 25 wherein each link in the first end module in each first link assembly is defined further as having a first side, a second side, a forward end and a rearward end, a link opening being formed through the rearward end of each link and extending generally between the first and the second sides thereof, and wherein each link in the second end module in each first link assembly is defined further as having a first side, a second side, a forward end and a rearward end, a link opening being formed through the rearward end of each link and extending generally between the first and the second sides thereof, and wherein each link in each intermediate module in each first link assembly is defined further as having a first side, a second side, a forward end and a rearward end, a link opening being formed through the rearward end of each link and extending generally between the first and the second sides thereof, and wherein each link in the first end module in each second link assembly is defined further has having a first side, a second side, a forward end and a rearward end, a link opening being formed through the rearward end of each link and extending generally between the first and the second sides thereof and wherein the half link has a first side, a forward end and a rearward end, a portion of a link opening being formed through the rearward end of the link and extending generally between the first and the second sides thereof, and wherein each link in the second end module of each second link assembly is defined further as having a first side, a second side, a forward end and a rearward end, a link opening being formed through the rearward end and extending generally between the first and the second sides thereof, the one half link having a second side, a forward end and a rearward end, a portion of a link opening being formed through the rearward end of the half link, and wherein each link in each intermediate link module in each second link assembly is defined further has having a first side, a second side, a forward end and a rearward end, a link opening being formed through the rearward end of each link and extending generally between the first and the second sides thereof, each half link being defined further as having at least one of a first and a second side and having a forward end and a rearward end, a portion of a link opening being formed through the rearward end.

27. The conveyor belt of claim 25 defined further to include:
a plurality of link shafts, each link shaft extending through the first shaft opening in one of the first or second link assemblies and through the second shaft opening in an adjacent one of the first and second link assemblies for connecting the link assemblies.

28. The conveyor belt of claim 25 wherein the first link assemblies, the second link assemblies and the link shafts each are defined further as being constructed of a resilient material comprising a plastic or ceramic.

29. A conveyor belt, comprising:
a plurality of first link assemblies with each first link assembly having a forward end, a rearward end, a first side and a second side, and a plurality of second link assemblies with each second link assembly having a forward end, a rearward end, a first side and a second side, and wherein each first link assembly is disposed generally between two adjacent second link assemblies, the first and the second link assembly being alternately positioned over the length of the conveyor belt, the forward end of each second link assembly being disposed near the rearward end of the adjacent first link assembly in an assembled position of the first and the second link assemblies to form the conveyor belt, each first link assembly comprising:
a first end module having a first end and a second end and comprising a plurality of links; and
a second end module having a first end and a second end and comprising a plurality of links; and
an intermediate module having a first end and a second end and comprising a plurality of links, the second end of the intermediate module being disposed near the second end of the first end module and the first end of the intermediate module being disposed near the second end of the second end module in an assembled position of the first and the second end modules and the intermediate modules to form the first link
assembly; and wherein each second link assembly is defined further as comprising:
a first end module having a first end and a second end and comprising a plurality of links, the link forming the second end of the first end module comprising about a one-half link;
a second end module having a first end and a second end and comprising a plurality of links, the link forming the second end of the second end module comprising about a one-half link; and
an intermediate module having a first end and a second end and comprising a plurality of links, the link forming the first end of the intermediate module comprising about one-half link and the end forming the second end of the intermediate module comprising about a one-half link, the first end of the intermediate module being disposed near the second end of the second end module and the second end of the intermediate module being disposed near the second end of the first end module in an assembled position of the first and the second end modules and the intermediate module to form the second link assembly whereby alternate rows of interconnected links in the conveyor belt do not include any spaced apart ends between the first and the second end modules or intermediate modules.

30. The conveyor belt of claim 29 wherein each link in the first end module in each first link assembly is defined further as having a first side, a second side, a forward end and a rearward end, a link opening being formed through the rearward end of each link and extending generally between the first and the second sides thereof, and wherein each link in the second end module in each first link assembly is defined further as having a first side, a second side, a forward end and a rearward end, a link opening being formed through the rearward end of each link and extending generally between the first and the second sides thereof, and wherein each link in the intermediate module in each first link assembly is defined further as having a first side, a second side, a forward end and a rearward end, a link opening being formed through the rearward end of each link and extending generally between the first and the second sides thereof, and wherein each link in the first end module in each second link assembly is defined further has having a first side, a second side, a forward end and a rearward end, a link opening being formed through the rearward end of each link and extending generally between the first and the second sides thereof and wherein the half link has a first side, a forward end and a rearward end, a portion of a link opening being formed through the rearward end of the link and extending generally between the first and the second sides thereof, and wherein each link in the second end module of each second link assembly is defined further as having a first side, a second side, a forward end and a rearward end, a link opening being formed through the rearward end and extending generally between the first and the second sides thereof, the one half link having a second side, a forward end and a rearward end, a portion of a link opening being formed through the rearward end of the half link, and wherein each link in the intermediate link module in each second link assembly is defined further has having a first side, a second side, a forward end and a rearward end, a link opening being formed through the rearward end of each link and extending generally between the first and the second sides thereof, each half link being defined further as having at least one of a first and a second side and having a forward end and a rearward end, a portion of a link opening being formed through the rearward end.

31. The conveyor belt of claim 29 defined further to include:
a plurality of link shafts, each link shaft extending through the first shaft opening in one of the first or second link assemblies and through the second shaft opening in an adjacent one of the first and second link assemblies for connecting the link assemblies.

32. The conveyor belt of claim 31 wherein the first link assemblies, the second link assemblies and the link shafts each are defined further as being constructed of a resilient material comprising a plastic or ceramic.

33. A conveyor belt, comprising:
a plurality of link assemblies each link assembly having a forward end, a rearward end, a first side and a second side, a first shaft opening extending through the forward end of each link assembly and a second shaft opening extending through the rearward end of each link assembly;
a plurality of link shafts, each link shaft constructed of a resilient material and extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and wherein each link assembly is defined further to comprise:
a plurality of links each link having a first side, a second side, a forward end and a rearward end, a link opening being formed through the rearward end of each link and extending generally between the first and the second sides, each link opening in one of the link assemblies being shaped and adapted to receive a portion of the forward end of one of the links in an adjacent link assembly, a first forward link shaft opening being formed through the first side of each link generally near the forward end of the link, and a second forward link shaft opening being formed through the second side of each link generally near the forward end of the link, the first and the second forward link shaft openings being aligned and sized to receive one of the link shafts and cooperating to form the first shaft opening, a first rearward link shaft opening being formed through the first side of each link generally near the rearward end of each link and a second rearward link shaft opening being formed through the second side of each link generally near the rearward end of each link, the first and the second rearward link shafts openings being aligned and sized to receive one of the link shafts and cooperating to form the second shaft opening, the first and the second sides of each link being expandable in directions generally away from each other when the conveyor belt is in tension and deforming each link shaft in a sine wave link shape to lengthen the conveyor belt; and
wherein each first shaft opening is defined further being elongated opening having a forward end formed on a radius larger than a radius of the link shafts and providing a shaft rocking surface within each first shaft opening, each link shaft being disposed generally adjacent the shaft rocking surface formed on one of the first shaft openings, and the link shafts rolling on the shaft rocking surfaces during the operation o the conveyor belt for substantially reducing rotating friction between the link shaft and adjacent portions of the link assemblies, the radius of each shaft rocking surface being sufficiently large so each shaft rocking surface approximates a flat surface while still being formed on a curve.

34. A conveyor belt, comprising:
a plurality of link assemblies, each link assembly constructed of a plastic or ceramic and having a forward end, a rearward end, a first side and a second side, a first shaft opening extending through the forward end of each link assembly and a second shaft opening extending through the rearward end of each link assembly;
a plurality of link shafts, each link shaft constructed of a plastic or ceramic material and extending through the first shaft openings in one of the link assemblies and through the second shaft openings in another link assembly for connecting the two link assemblies, each link shaft having a first end which extends a distance beyond the first side of one of the link assemblies and a second end which extends a distance beyond the second side of one of the link assemblies; and wherein each first shaft opening is defined further as being an elongated opening having a forward end formed on a radius larger than a radius of the link shafts and providing a shaft rocking surface within each first shaft opening, each link shaft being disposed generally adjacent the shaft rocking surface formed on one of the first shaft openings, and the link shafts rolling on the shaft rocking surfaces during the operation of the conveyor belt for substantially reducing rotating friction between the link shafts and adjacent portions of the link assemblies, the radius of each shaft rocking surface being sufficiently large so each shaft rocking surface approximates a flat surface while still being formed on a curve.

* * * * *